United States Patent
Chikirivao et al.

(10) Patent No.: US 9,742,614 B2
(45) Date of Patent: Aug. 22, 2017

(54) DATA-TYPE DEFINITION DRIVEN DYNAMIC BUSINESS COMPONENT INSTANTIATION AND EXECUTION FRAMEWORK

(75) Inventors: Bill S. Chikirivao, Denver, CO (US); Robert C. Bodnar, Highlands Ranch, CO (US)

(73) Assignee: WELLOGIX TECHNOLOGY LICENSING, LLC, Houston, TX (US)

(*) Notice: Subject to any disclaimer, the term of this patent is extended or adjusted under 35 U.S.C. 154(b) by 2797 days.

(21) Appl. No.: 10/121,310

(22) Filed: Apr. 12, 2002

(65) Prior Publication Data
US 2002/0188761 A1 Dec. 12, 2002

Related U.S. Application Data

(60) Provisional application No. 60/283,701, filed on Apr. 12, 2001.

(51) Int. Cl.
*G06F 15/16* (2006.01)
*H04L 29/06* (2006.01)
(Continued)

(52) U.S. Cl.
CPC ............ *H04L 29/06* (2013.01); *G06F 17/227* (2013.01); *G06Q 10/06* (2013.01); *G06Q 10/10* (2013.01);
(Continued)

(58) Field of Classification Search
CPC .................................. G06Q 30/04; H04L 29/06
(Continued)

(56) References Cited

U.S. PATENT DOCUMENTS 5,168,445 A 12/1992 Kawashima et al.
5,446,885 A 8/1995 Moore et al.
(Continued)

FOREIGN PATENT DOCUMENTS

WO 0167354 A1 9/2001

OTHER PUBLICATIONS cXML/1.0 specification Aug. 16, 1999 https://web.archive.org/web/20000816174752/http://www.cxml.org/files/cxml.pdf.*
(Continued)

*Primary Examiner* — Kevin Mai
(74) *Attorney, Agent, or Firm* — Birch, Stewart, Kolasch & Birch, LLP

(57) ABSTRACT

In a complex workflow environment, a data-type-definition (DTD) schema drives a dynamic business component instantiation and execution framework that integrates documents with data and information created by various applications, potentially operating on several different platforms, enabling complex workflow and collaboration to occur over a communication network such as the Internet. The DTD execution language is preferably an industry specific XML-based tag set that defines business component instantiation, execution, input and output parameters, workflow, user profile, and collaboration specifications for a given task or data in a complex workflow process. Business and data processing components available on systems both within and outside the complex workflow system are called upon to provide the processing, interpretation, and transformation functions for the complex workflow system. The results of such processing are then returned to the complex workflow system for integration within the workflow process.

41 Claims, 7 Drawing Sheets

(51) Int. Cl.
*G06F 17/22* (2006.01)
*G06Q 30/04* (2012.01)
*G06Q 10/06* (2012.01)
*G06Q 10/10* (2012.01)
*G06Q 30/06* (2012.01)
*H04L 29/08* (2006.01)

(52) U.S. Cl.
CPC .............. *G06Q 30/04* (2013.01); *G06Q 30/06* (2013.01); *H04L 67/02* (2013.01)

(58) Field of Classification Search
USPC .......... 455/414, 418, 466; 707/10, 102, 200; 709/205, 223
See application file for complete search history.

(56) References Cited

U.S. PATENT DOCUMENTS

| | | | |
|---|---|---|---|
| 5,634,054 A | 5/1997 | Sarachan | 395/611 |
| 5,737,739 A | 4/1998 | Shirley et al. | 707/512 |
| 5,838,971 A | 11/1998 | Stadler et al. | 395/684 |
| 5,862,325 A | 1/1999 | Reed et al. | 395/200.31 |
| 5,920,879 A | 7/1999 | Kyojima et al. | 707/517 |
| 6,044,205 A | 3/2000 | Reed et al. | 395/200.31 |
| 6,088,717 A | 7/2000 | Reed et al. | 709/201 |
| 6,112,199 A | 8/2000 | Nelson | 707/4 |
| 6,237,041 B1 | 5/2001 | Haal et al. | 709/246 |
| 6,250,309 B1 | 6/2001 | Krichen et al. | 128/899 |
| 6,263,485 B1 | 7/2001 | Schofield | 717/1 |
| 6,279,006 B1 | 8/2001 | Shigemi et al. | 707/101 |
| 6,314,434 B1 | 11/2001 | Shigemi et al. | 707/203 |
| 6,321,217 B1 | 11/2001 | Maeda et al. | |
| 6,345,278 B1 | 2/2002 | Hitchcock et al. | |
| 6,345,288 B1 | 2/2002 | Reed et al. | 709/201 |
| 6,349,305 B1 | 2/2002 | Hara et al. | 707/102 |
| 6,658,624 B1* | 12/2003 | Savitzky et al. | 715/235 |
| 6,772,216 B1* | 8/2004 | Ankireddipally et al. | 709/230 |
| 6,820,069 B1 | 11/2004 | Kogan et al. | |
| 6,845,155 B2 | 1/2005 | Elsey | |
| 6,968,328 B1 | 11/2005 | Kintzer et al. | |
| 7,945,492 B1* | 5/2011 | Sun et al. | 705/35 |
| 2001/0027459 A1 | 10/2001 | Royal | 707/513 |
| 2001/0037346 A1 | 11/2001 | Johnson | 707/513 |
| 2001/0047385 A1 | 11/2001 | Tuatini | 709/203 |
| 2002/0010781 A1 | 1/2002 | Tuatini | 709/227 |
| 2002/0023654 A1 | 2/2002 | Webb | 128/899 |
| 2002/0026471 A1 | 2/2002 | Bent et al. | 709/101 |
| 2002/0029304 A1 | 3/2002 | Reynar et al. | 709/332 |
| 2002/0032693 A1 | 3/2002 | Chiou et al. | 707/500 |
| 2002/0032709 A1 | 3/2002 | Gessner | 707/540 |
| 2002/0032783 A1 | 3/2002 | Tuatini | 709/229 |
| 2003/0008650 A1* | 1/2003 | Matsuyama et al. | 455/426 |
| 2003/0055815 A1 | 3/2003 | Chender et al. | |
| 2003/0154144 A1 | 8/2003 | Pokorney et al. | |
| 2004/0039720 A1 | 2/2004 | Hodges et al. | |

OTHER PUBLICATIONS

Dennis L. Prince, "Getting Started with SAP™ R/3™," copyrighted in 1998 by Prima Publishing, US.
Cary N. Prague and Michael R. Irwin, "Microsoft Access 2000 Bible," copyrighted in 1999 by IDG Books Worldwide, Inc., US.
Selected Excerpts from the SAP R/3 Online Help for R/3 version 4.5B, released in Mar. 1999.
Elaine Marmel, "Microsoft Project 2000 Bible," copyrighted in 2000 by IDG Books Worldwide, Inc., US.
Simon Sharpe, "10 Minute Guide to SAP R/3," copyrighted in 1997 by Que Corporation, US.
Grady Booch, "Object-Oriented Analysis and Design with Applications," Second Edition, copyrighted in 1994 by The Benjamin/Cummings Publishing Company, Inc., US.
M.J. Fear, N.C. Meany, J.M. Evans, "An Expert System for Drill Bit Selection," IADC/SPE Drilling Conference, published Feb. 15, 1994, US.
M. Zamora and M.A. Merchant, M-1 Drilling Fluids Co., "Optimized PC-Based Expert Systems," Petroleum Industry Application of Microcomputers, Jun. 23, 1987, US.
John Hedtke, "Peachtree Accounting for Windows Made Easy," copyrighted in 1995 by McGraw-Hill, Inc., US.

* cited by examiner

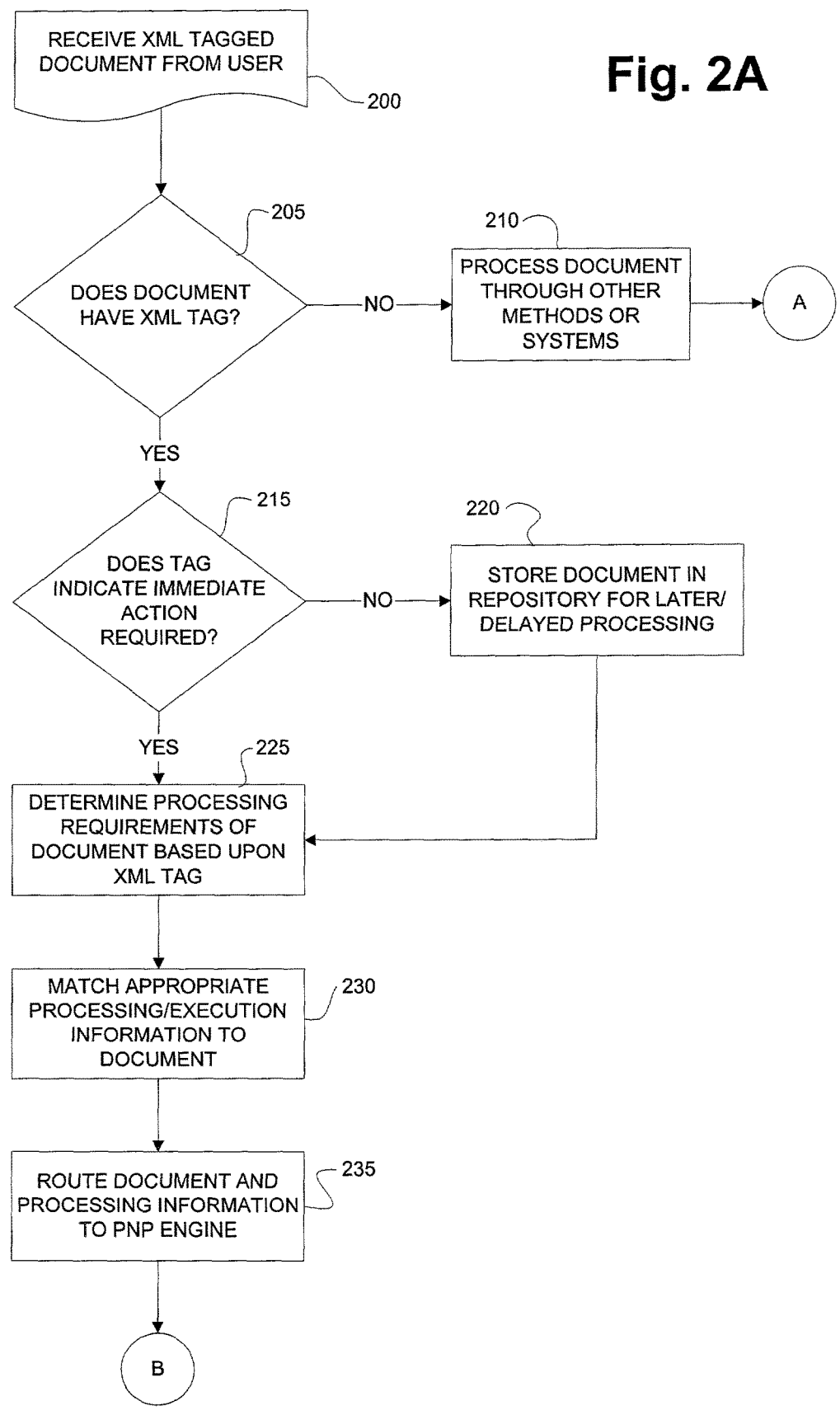

Fig. 3

```
<wellXML doctype=dailyDrillingReport>     ~310
    <project>
        <well>
            <dailyDrillingReport>
                <operational>
                    <wellName>CRP #3</wellName>
                    <wellID>1795</wellID>
                    <eventType>Drilling</eventType>
                    <eventSeqNumber>1</eventSeqNumber>
                    <fieldName>Duval South</fieldName>
                    <reportNumber>53</reportNumber>
                    <reportDate>1998-04-27</reportDate>
                    <reportTime/>
                    <operatorName>Wellogix Operator - DevBox</operatorName>
                    <supervisorName/>
                    <rigContractor>Sedco Forex</rigContractor>
                    <rigNameNumber>Rig 1</rigNameNumber>
                    <rigAcceptDate>1998-03-06</rigAcceptDate>
                    <rigAcceptTime>1630</rigAcceptTime>
                    <rigReleaseDate>1998-04-26</rigReleaseDate>
                    <rigReleaseTime>2400</rigReleaseTime>
                    <spudDate>1998-03-07</spudDate>
                    <spudTime>800</spudTime>
                    <daysSinceSpud>51</daysSinceSpud>
                    <groundElev>853</groundElev>
                    <depthRefType>KB</depthRefType>
                    <depthRefValue>19.50</depthRefValue>
                    <lastCasingSize/>
                    <lastCasingDepth>9287</lastCasingDepth>
                    <depthAtReportTime>14645</depthAtReportTime>
                    <depthTVDAtReportTime>14645</depthTVDAtReportTime>
                    <drillLast24hrs/>
                    <dailyForecast/>
                    <dailySummary/>
                    <currentOperation>Release rig</currentOperation>
                    <shoeTest/>
                    <totalDailyCost>13506</totalDailyCost>
                    <phaseOfOperation>Move</phaseOfOperation>
                </operational>
                <holeSummary>
                    <wellID>1795</wellID>
                    <eventType>Drilling</eventType>
                    <eventSeqNumber>1</eventSeqNumber>
                    <holeSection>Conductor</holeSection>
                    <holeDiameter>20</holeDiameter>
                    <topMD>0</topMD>
                    <bottomMD>40</bottomMD>
                    <topTVD>0</topTVD>
                    <bottomTVD>40</bottomTVD>
                </holeSummary>
                <casingSummary>
                    <wellID>1795</wellID>
                    <eventType>Drilling</eventType>
                    <eventSeqNumber>1</eventSeqNumber>
                    <holeSection>Conductor</holeSection>
                    <casingSize>20</casingSize>
                    <casingWeight/>
                    <casingGrade/>
                    <threads>8R</threads>
                    <topMD>19.50</topMD>
                    <bottomMD>59.50</bottomMD>
                    <topTVD>19.50</topTVD>
                    <bottomTVD>59.50</bottomTVD>
                </casingSummary>
            </dailyDrillingReport>
        </well>
    </project>
</wellXML>
```

DATA-TYPE DEFINITION DRIVEN DYNAMIC BUSINESS COMPONENT INSTANTIATION AND EXECUTION FRAMEWORK

CROSS REFERENCE TO RELATED APPLICATIONS

This application claims the benefit of priority of U.S. provisional application Ser. No. 60/283,701 filed Apr. 12, 2001 entitled Data-Type Definition Driven Dynamic Business Component Instantiation and Execution Framework, which is hereby incorporated by reference as though fully set forth herein. This application is related to U.S. application Ser. No. 09/672,938 filed Sep. 28, 2000 entitled Process and System for Matching Buyers and Sellers of Goods and/or Services, and U.S. application Ser. No. 09/801,016 filed Mar. 6, 2001 entitled Method and Process for Providing Relevant Data, Comparing Proposal Alternatives, and Reconciling Proposals, Invoices, and Purchase Orders with Actual Costs in a Workflow Process, each of which are hereby incorporated by reference as though fully set forth herein.

BACKGROUND OF THE INVENTION

1. Field of the Invention

This invention relates generally to the use of data-type definition language to identify types of electronic files and provide functional instructions for the processing of such files. The invention further relates to systems for managing workflow processes over a communication network.

2. Description of the Related Art

Present systems for enhancing business workflow, whether intra-business or inter-business are generally limited to the scope of the information subject matter they were designed to address. For example, some accounting systems have the ability to import information from external sources in order to manipulate it according to the processes and constructs of that system. Some systems have integrated even more categories of business information to provide more comprehensive tracking and business management capabilities for the user. For example, available "enterprise software" applications track not only accounting information, but also sales, inventory, pricing, shipping, and other information in a single, integrated environment.

The limitation of these systems is that information provided to these systems must be in a format that is recognizable and manipulable by the systems. In many instances, the information must be entered in a system specific environment in order to be recognized and processed by the system. Further, many of the more complex systems integrating various and previously disparate functions require the components of the systems to constantly monitor the information flowing through the system to determine whether that information is relevant to that component and therefore whether that component must then perform some function.

Many of these systems take the form of a hub and spoke network as seen in prior art FIG. 6. For example, an enterprise integration system could have a hub for routing information from one application to the others on the network. A hub contains multiple ports and is used to connect segments of the network. When an information packet arrives at one port, it is copied to the other ports so that all enterprise applications on the network can see all packets. A hub serves simply as a conduit for the data, enabling it to go from one application on the network to another. In this example, when an order is entered in the ordering interface application, the hub publishes the order to each of the other applications in the network. The accounting application monitoring the network may capture the order information transmitted by the hub to store it for future action. Upon receiving the order information, the inventory database application may reduce the inventory a corresponding quantity and publish the reduction to the hub. The accounting application, with receipt of the inventory publication from the hub, now knows that the order can be fulfilled and then uses the order information previously received to credit the ledger.

However, the shipping application may not be activated by the order information inherently received from the hub. Instead the shipping application waits for information from the inventory application before initiating shipping arrangements, because if there is no product in inventory there is nothing to ship. The shipping application may then publish shipping costs to the hub, which are transmitted to all applications on the network. While the inventory and ordering applications do not need the shipping information received, the accounting application debits the shipping costs to the ledger when the shipping information is received to populate and maintain the business books. In a hub and spoke system, therefore, any information received at the hub is published to all other applications on the network, regardless of whether they have use for the information. The applications are in constant communication with the hub to monitor for relevant incoming information that indicates that they must take action. This constant publication and monitoring can result in bottlenecks in the network.

Another prior art system is a channel-based enterprise integration model as shown in prior art FIG. 7. An example using business process systems integrating accounting, ordering, shipping, and inventory modules is again depicted. In a channel model, instead of a hub operating to serve as a focal point for the distribution of incoming information, different applications subscribe to one or more channels to monitor for or to publish an event. For example, an event might be an "order entered" published by the ordering application to this channel. All other applications with an interest in an "order entered" event would subscribe to monitor that particular channel. For example, an inventory application would subscribe to the "order entered" channel in order to check the inventory database to ensure that the order entered is available in inventory. If the item ordered was available, the inventory application could publish to another channel called "fulfill order" to which a shipping application could be a subscriber. This can be a waste of significant resources in terms of processing power and bandwidth for communications. By creating specific channels for specific events, the channel model helps avoid the bottleneck drawback of the hub and spoke model. However, applications in the channel model must still maintain a constant connection with subscription channels to monitor for pertinent new information.

SUMMARY OF THE INVENTION

In a complex workflow system, it is desirable to integrate documents with data and information created by various applications, perhaps even operating on several different platforms. Integration of such documents in the complex workflow system may be difficult because the workflow system may not have the necessary components or applications to process, interpret, or transform the data in the documents into data manageable by the workflow system.

Further, creating or integrating the necessary components or applications for processing and interpreting the documents can be extremely time and resource consuming and a significant expense; in fact it may be never-ending. On the other hand, the information contained in such files could be very valuable to the complex workflow process.

In order to integrate the information in such files into the complex workflow environment, an XML-driven dynamic business component instantiation and execution framework is created, enabling complex workflow and collaboration to occur over a communication network, for example, the Internet. Business and data processing components available on systems both within and outside the complex workflow system are called upon to provide the processing, interpretation, and transformation functions for the complex workflow system. The results of such processing are then returned to the complex workflow system for integration within the workflow process. In this way, the complex workflow system maintains a focus on the workflow process, rather than branching out into other tangential processing functions.

A data-type-definition (DTD) or schema, preferably an extensible mark-up language (XML) schema, is contemplated for the consistent, dynamic exchange of complex services data via valid DTD encoded documents. These DTDs provided for documents can be global or industry specific depending upon the processes desired by any particular workflow system. The DTD execution language is preferably an XML-based tag set that defines business component instantiation, execution, input and output parameters, workflow, user profile, and collaboration specifications for a given task or data in a complex workflow process. A language execution broker matches incoming DTD documents with appropriate processing instructions, also preferably identified by DTDs, and dispatches the documents and instructions to a processor selection component, for example, a dynamic plug-and-play (PNP) engine, for execution.

The PNP engine then executes the instructions in the DTD document by calling upon the necessary processing objects or components, either internal or external on third party processing systems. The PNP engine either calls a local object or routes the DTD document and instructions to an external application. The PNP engine also orchestrates the processing flow and collaboration with the external components as defined by the particular DTD document and instructions. The PNP engine preferably interfaces in an object-oriented environment such that objects, applications, and other components called upon by the PNP engine can be added, removed, or updated dynamically without affecting the functionality of the PNP engine.

BRIEF DESCRIPTION OF THE DRAWINGS

FIGS. 2A and 2B depict a flow diagram of the process implemented according to the present invention for routing and processing information.

FIG. 3 is an exemplary representation of a preferred embodiment XML data-type definition document as used by the systems and processes of the present invention.

DETAILED DESCRIPTION OF THE INVENTION

Figure 1:
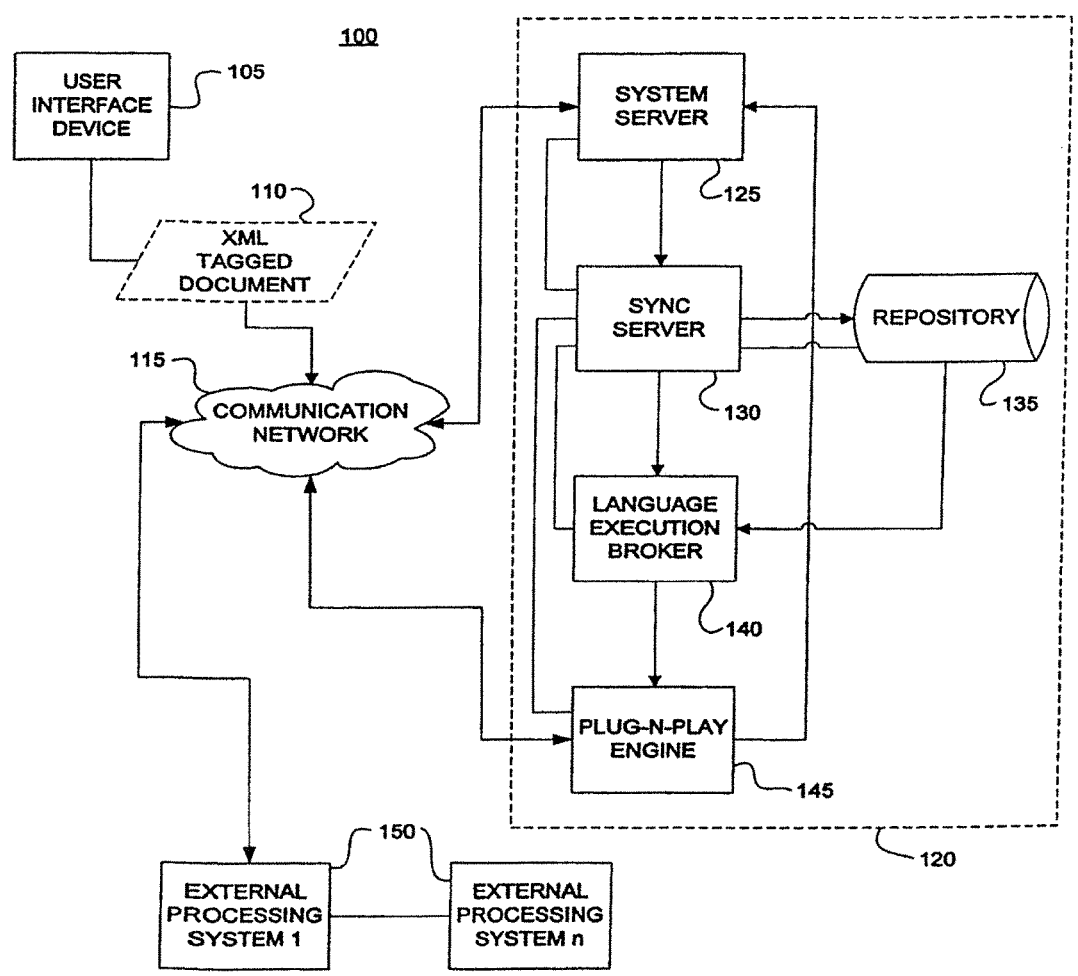
FIG. 1 is a flow diagram of the components of a framework for providing dynamic business component instantiation and execution in the present inventive system to process data and information in a complex workflow environment.

The interaction of the components of the dynamic DTD processing system 100 is shown in FIG. 1. A user initiates a connection with a complex workflow platform 120 over a communication network 115 through a user interface device 105. The communication network is preferably the Internet, but it can likewise be any other sort of communication network, for example, an intranet, an extranet, a local area network, a wide area network, a public network, and a private network. The user interface device 105 can be any sort of processor device with the ability to connect to the communication network and transmit data, for example, a personal computer or a computer workstation. The user interface device could also be a wireless device such as a personal digital assistant (PDA), a wireless telephone, a web pad, or other wireless device. If the user interface device 105 has the capability to directly connect to the communication network, the transfer of information to the complex workflow platform 120 can be immediate. For example, the complex workflow platform 120 may provide web-based templates and documents from its system server 125 for the user to directly access and populate with information via a web browser on the user interface device.

In other instances, the user may not be able to directly access the complex workflow platform and the transfer of information may be delayed. For example, a user with a PDA may work on browser-based documents while offline, using XML or other DTD-based browser generation and data storage processes instead of server-based. The information entered into these documents may be stored on the PDA as, for example, XML documents until the user has access to a network. The user then has two options: 1) to directly synchronize document information from the PDA over a connection with the communication network 115 with project or document information already residing on the system server 125; or 2) to first synchronize the information on the PDA with a desktop personal computer utilizing synchronization client software or any other appropriate application, and then to synchronize with the system server 125 from the desktop computer. The synchronization and transmission preferably takes place via secure socket layer connections between the user interface device 105 and the system server 125.

The data, information, object, application, relational data structure, or other file type (herein referred to individually as a "document" or collectively as "documents") prepared by a user and transmitted from the user interface device 105 is preferably tagged with DTD information. In the preferred embodiment the DTD language used is XML and the user transmitted documents referred to herein are XML tagged documents 110. An XML tagged document 110 can be generated within a client application correlative to the complex workflow platform 120 environment, or by any other application. An XML tagged document 110 may likewise be generated on the system server 125 within the complex workflow platform 120, for example, via user input into web-based templates resident on the system server 125.

In a preferred embodiment the XML tags are taken from a particular set that defines business component instantiation and execution, input and output parameters, and workflow and collaboration specifications for a given complex workflow process. An XML tagged document 110 preferably has at minimum an "XML set" tag to identify the particular industry XML subset, and a "document type" tag that would be used to match the document with appropriate XML based processing instructions. Other sets of DTD language constructs may be used to tag documents for performance within the scope of this invention.

A specific instantiation of a preferred complex workflow platform 120 is the workflow system for the upstream oil and gas industry disclosed in two prior, related U.S. patent applications identified by Ser. No. 09/672,938 filed Sep. 28, 2000 entitled Process and System for Matching Buyers and Sellers of Goods and/or Services, and Ser. No. 09/801,106 filed Mar. 6, 2001 entitled Method and Process for Providing Relevant Data, Comparing Proposal Alternatives, and Reconciling Proposals, Invoices, and Purchase Orders with Actual Costs in a Workflow Process. The XML tagged documents 110 in such an embodiment preferably adhere to a specific subset of XML to provide deep vertical integration within the oil and gas industry. Such an XML subset called WellXML™ has been proposed and developed by Wellogix, Inc. of Houston, Tex. An exemplary XML tagged document 110 using WellXML™ tags is shown in FIG. 3.

The XML tagged document1 110 of FIG. 3 begins with a subset identification 300 of the particular XML subset in which the document is coded, in this case "wellXML." Additionally, a document type identifier 310 is present to provide the document type, which is generally industry and XML subset specific. The document type 310 is a minimal indication to the complex workflow platform of the process requirements for the document. In this example, the document type is "<dailyDrillingReport>." Other tags in the XML tagged document 110 include specific data types 320 ("<holeSummary>") and 324 ("<casingSummary>"), each of which further include multiple data fields 322 and 326 such as input parameters and others. The data types 320, 324 and data fields 322, 326 provide additional information for use in processing the XML tagged document 110. A further XML tag may provide a user profile 340 ("<operational>") indicating information about the user that can be used to provide processing routines specific to that user. The data structure of the XML tagged document 110 may be thought of as an "envelope." The data transferred in the document is wrapped (or enveloped) in XML tags that identify the nature of the document, the identity of the sender, processing instructions, and an addressee for transmission; it further may contain return address information.

Returning to FIG. 1, the complex workflow platform 120 is composed of a system server 125 that interfaces with users via the communication network 115 to facilitate the transfer of documents and other data generated by a user at a user interface device 105. The complex workflow platform further preferably has a synchronization server 130 that constantly checks for incoming XML tagged documents 110 at the system server 125 and coordinates the processing of the documents 110 in the workflow platform 120. The synchronization server 130 may either pass the XML tagged document 110 to a predetermined holding repository 135 or forward the XML tagged document 110 directly to a language execution broker 140 upon reception. The XML tagged document 110 does not necessarily have to be placed in the repository 135, but such placement may be preferred if there is not an urgent need for processing the document or it is known that processing is not immediately possible.

The language execution broker 140 reads the tags on the XML tagged document 110 and, if necessary, provides additional information or instructions in order to ensure appropriate processing of the XML tagged document 110. The language execution broker 140 initially reads the "document type" 310 of the incoming XML tagged document 110, matches it with the appropriate XML-based processing instruction set, and forwards these two documents to the PNP engine 145 for processing. The XML based processing set contains key processing information, for example: the name of the component, application, or software object (hereinafter collectively "component(s)") that processes the incoming document; the methods of that component that should be executed; the location of the component, either within the complex workflow platform 120 or accessible over the network 115; the input and output parameters for the particular component; and if more than one component is needed to process the incoming document, the processing set provided by the language execution broker 140 includes instructions for orchestrating the workflow between the components. Any additional instructions determined by the language execution broker are attached to the XML tagged document 110 as it is routed for additional processing.

With reference to the exemplary XML tagged document of FIG. 3, the functions of the language execution broker 140 can be further detailed. Again, in this example, the subset identification 300 is "wellXML" so the language execution broker 140 knows to look for processing instructions related only to the "wellXML" subset. The language execution broker next notes the document type 310, which in this example is "<dailyDrillingReport>." If certain standard processes are generally applied to a "(dailyDrillingReport)" document, the language execution broker 140 attaches these instructions. Also, if there are user profile tags 340 as part of the document, these may indicate to the language execution broker 140 that user specific processing components are desired and should be chosen over general components used for that document type 310 or data type 320, 324. In addition to processes linked to the document type 310, the document further includes the data types 320 and 324 that the language execution broker may recognize as requiring additional specific processing components. In fact, based upon the data types 320 in a particular document, the process results for a first data type may be required by the methods of the component processing a second data type. In this case the instructions provided by the language execution broker may dictate an order for processing various document types 310 or data types 320 and 324, or the instructions may indicate that the process results for one data type be saved for use in future processing calls to other components. For example, the component processing the "<holeSummary>" data type 320 may require process results from the component that processed the "<casingSummary>" data type 324. Therefore, the language execution broker 140 may instruct that the "<casingSummary>" data type 324 be processed first.

After the language execution broker 140 has matched the XML tagged document 110 with the appropriate XML language processes, it then dispatches the document, along with the processing information, to the dynamic Plug and Play (PNP) engine 145 for execution. The PNP engine 145 executes the instructions in the XML tagged document 110, and in any further attachments thereto generated by the language execution broker 140, by dynamically calling upon the necessary business component found in either an internal component of the complex workflow platform 120 or an external processing system 150, and orchestrating the entire workflow and collaboration process as defined by the particular XML tagged document 110. The PNP engine can interface with numerous external processing systems 150 that have many and varied business component processes in order to appropriately process the XML tagged document 110 for use by the complex workflow system 120. The PNP engine 145 contacts the desired external processing systems 150 as needed and transmits the XML tagged document 110 and supporting instructions for processing.

The PNP engine 145 uses the XML-based processing instructions in its dynamic instantiation and execution of external processing systems 150. The PNP engine 145 makes the appropriate dynamic component calls depending upon the nature of the external processing system 150. For example, the PNP engine 145 can simply transmit the necessary information from the XML tagged document 110 and from any additional XML instructions as XML via hypertext transfer protocol (HTTP) if the external processing system 150 is a simple object access protocol (SOAP) enabled web service or related architecture. In this case the PNP engine 145 would contact the external processing system 150 by its uniform resource locator (URL) and request, using web services description language (WSDL), the data variables needed by the processing system 150 and the expected data type return after processing. Once this information is known the PNP engine 145 sends the appropriate XML tagged data to the URL for processing and provides a URL for return of the process result to the PNP engine 145.

Other methodologies for calling external processing systems into service may be used by the PNP engine 145. A second exemplary method is through dynamic Java® component instantiation using reflection- and introspection-based components. Briefly, this is a Java® construct wherein the PNP engine 145 asks an object about itself and the object returns information about the functions it performs, the input parameters it requires, and the output parameters it provides. This allows the PNP engine 145 to determine what data to provide to the object for processing. A third exemplary method is to use Java® native interface capabilities to similarly ask a non-Java® component (e.g., C, C++) how to instantiate itself and what input parameters it requires. A fourth exemplary method employs Java database connectivity (JDBC) to interface with all JDBC enabled databases. The connectivity protocol allows the PNP engine 145 access to a database to determine requirements for start procedures in the database, call methods, and input and output parameters. This method also allows for both structured query language (SQL) calls and access to stored procedures.

None of the external processing systems 150 needs to monitor the PNP engine 145 for data that they have the ability to process. Rather, the PNP engine 145 contacts only an external processing system 150 with desired business components, which is then instantiated for processing the XML tagged documents 110. The XML tagged document 110 can therefore originate from any application or platform. However, with the identification of the XML tags, the PNP engine 145 can chose an appropriate internal component or external processing system 150 to process the XML tagged document 110 according to the instructions defined therein and provide resulting information, or the document itself, in a format that can be integrated into the workflow process of the complex workflow system 120.

Figure 2B:
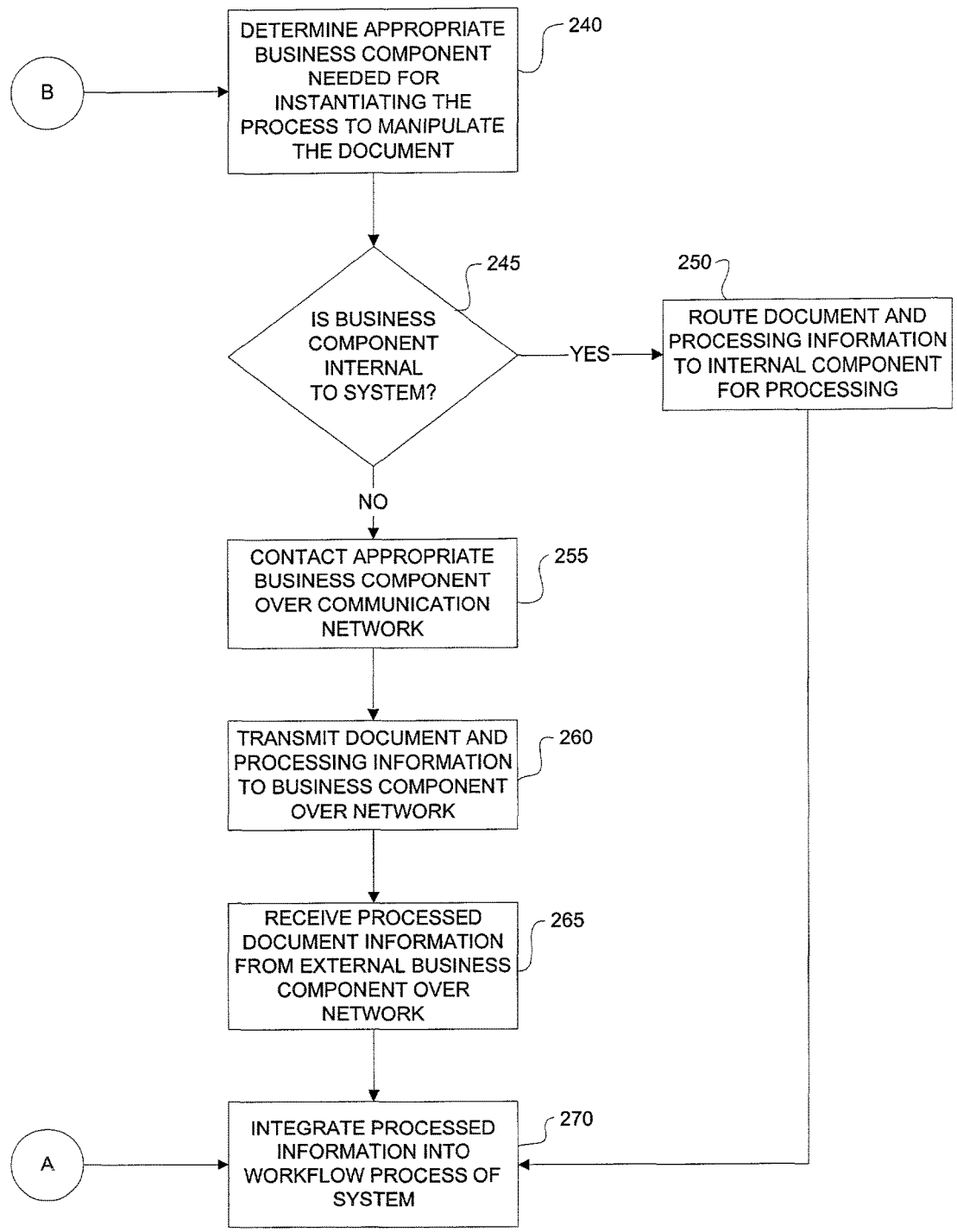

FIGS. 2A and 2B depict the routing and processing steps of the XML tagged document 110 through the dynamic DTD processing system 100. At step 200 the XML tagged document 110 is received at the system server 125. The synchronization server 130, which is constantly monitoring the data exchanges by the system server 125, determines whether an incoming document has an XML tag, step 205. If not, the document is processed through the normal functions of the complex workflow system 120, step 210, and integrated into the workflow process of the complex workflow system 120, step 270. If the document is determined by the synchronization server 130 to be an XML tagged document 110, the synchronization server 130 accesses the XML tagged document 110 from the system server and determines whether immediate processing is required, step 215. If it is determined that no immediate processing is necessary, the synchronization server 130 stores the XML tagged document 110 in a repository for delayed processing step 220.

If immediate processing of the XML tagged document 110 is necessary for the operation of the complex workflow system, or otherwise desired, or if it is appropriate for an XML tagged document 110 stored in the repository to be processed, the function moves to step 225. At step 225, the language execution broker 140, to which the XML tagged document 110 is passed by the synchronization server 130, determines the processing requirements of the XML tagged document 110 based upon the information provided about the document 110 in the XML tag. The language execution broker 140 attaches any necessary additional processing information for the XML tagged document 110 document, based upon the XML tags, step 230 and then routes the XML tagged document 110 and any additional processing instructions, to the PNP engine 145, step 235.

The PNP engine 145 next determines the appropriate business component to instantiate to process the XML tagged document 110 according to the instructions provided in the XML tags, step 240. The PNP engine queries whether the appropriate business component is internal to the complex workflow system, step 245. If the complex workflow system has the ability to process the XML tagged document 110 document internally, the document 110 is routed within the complex workflow system 120 to the appropriate component for processing. Once processed, the document 110, or the information or data therein, is integrated into the workflow process of the complex workflow system 120, step 270.

If the XML tagged document 110 cannot be processed internally, the PNP engine 145 contacts an appropriate business component on an external system 150 to instantiate it for processing XML tagged document 110, step 255. The XML tagged document 110 is transmitted over the communication network 115 to the business component of the external processing system 150. Once the XML tagged document 110 has been processed by the chosen external processing system 150, the processed document 110 is returned to the PNP engine 145 over the communication network 115, step 265, and integrated into the workflow process of the complex workflow system 120, step 270.

Figure 4:
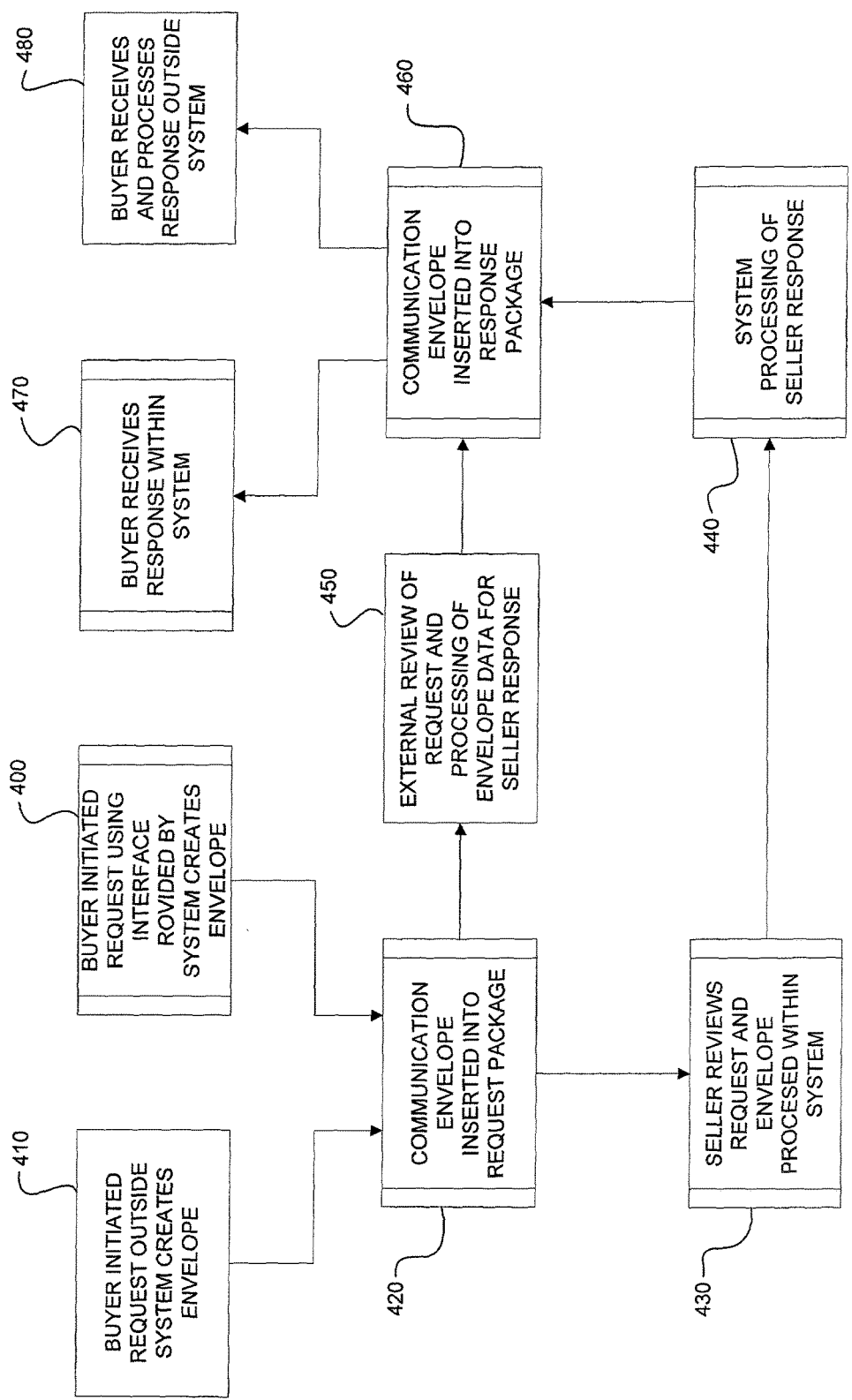
FIG. 4 is a relationship diagram depicting the relationship between process functions in a preferred embodiment applying the methods of the present invention.

In addition to providing for the dynamic instantiation of external components for processing data used by the dynamic DTD processing system 100, the methodologies disclosed also provide an ability for users who are not able to use the complex workflow platform 120, or who have documents that cannot be created within the complex workflow platform 120, to interface with other users. FIG. 4 shows various possibilities for users of the system in the preferred oil and gas industry embodiment, referenced previously, to interact through the assistance of the DTD dynamic processing system 100. In the preferred oil and gas embodiment, a buyer generally initiates a request for a quote from a seller of goods or services by preparing a request on the complex workflow platform 120 through an interface, block 400. In this case the DTD processing system 100 on the platform 120 tags the data and documents in the request and creates various XML communication envelopes. These communication envelopes are inserted into an entire request package for submission to a seller of the desired goods or services, block 420. There may be a situation, however, where the buyer is unable to enter his request directly through the platform 120, and instead creates a request for goods and services outside the platform, block 410. If the buyer appropriately tags the documents in the request with the industry specific DTD language subset to create communication envelopes recognizable by the system 100, the externally created envelopes can similarly be inserted into a request package for submission to a seller, block 420.

Normally then, the seller would be notified by the complex workflow platform 120 that a request is available for review, and the seller would review the data and documents in the request through the seller's interface with the platform 120, block 430. In this case as well, the communication envelopes in the request would be processed by the DTD dynamic processing system 100. As an alternative, if the seller is not part of the complex workflow platform, the communication envelopes may simply be passed by the platform 120 to the seller's external system for processing and review by the seller external to the platform 120. In this instance, the DTD dynamic processing system 100 might not actually process the envelopes for the seller, but merely route them to the seller for external processing, block 450.

A response by a seller to a request by a buyer is normally prepared within the complex workflow platform 120 via inputs from the seller through an interface, block 440. The DTD dynamic processing system 100 appropriately tags response documents and inserts the envelopes created into a response package made available to the buyer, block 460. However, in the event the seller is external to the platform 120, the seller may still pass appropriately tagged documents to the platform 120, block 450, which will be recognized by the DTD dynamic processing system and inserted in to a response package to be made available to the buyer, block 460. Again, normally the buyer would be notified that a response to a request is available and review the response as processed by the DTD dynamic processing system 100 within the platform 120 through a user interface, block 470. However, in the event the buyer is external to the complex workflow platform 120, the response package may merely be routed to the buyer's external system for processing and review by the buyer system. In this way, through the use of the tagged documents in communication envelopes, the workflow processes of the platform 120 are made accessible to a greater body of users. This may be desirable for users who, for example, would rather use their own, perhaps proprietary, processing systems to analyze the data and documents, but still want the opportunity to interface with other users through the complex workflow platform 120.

Figure 5:
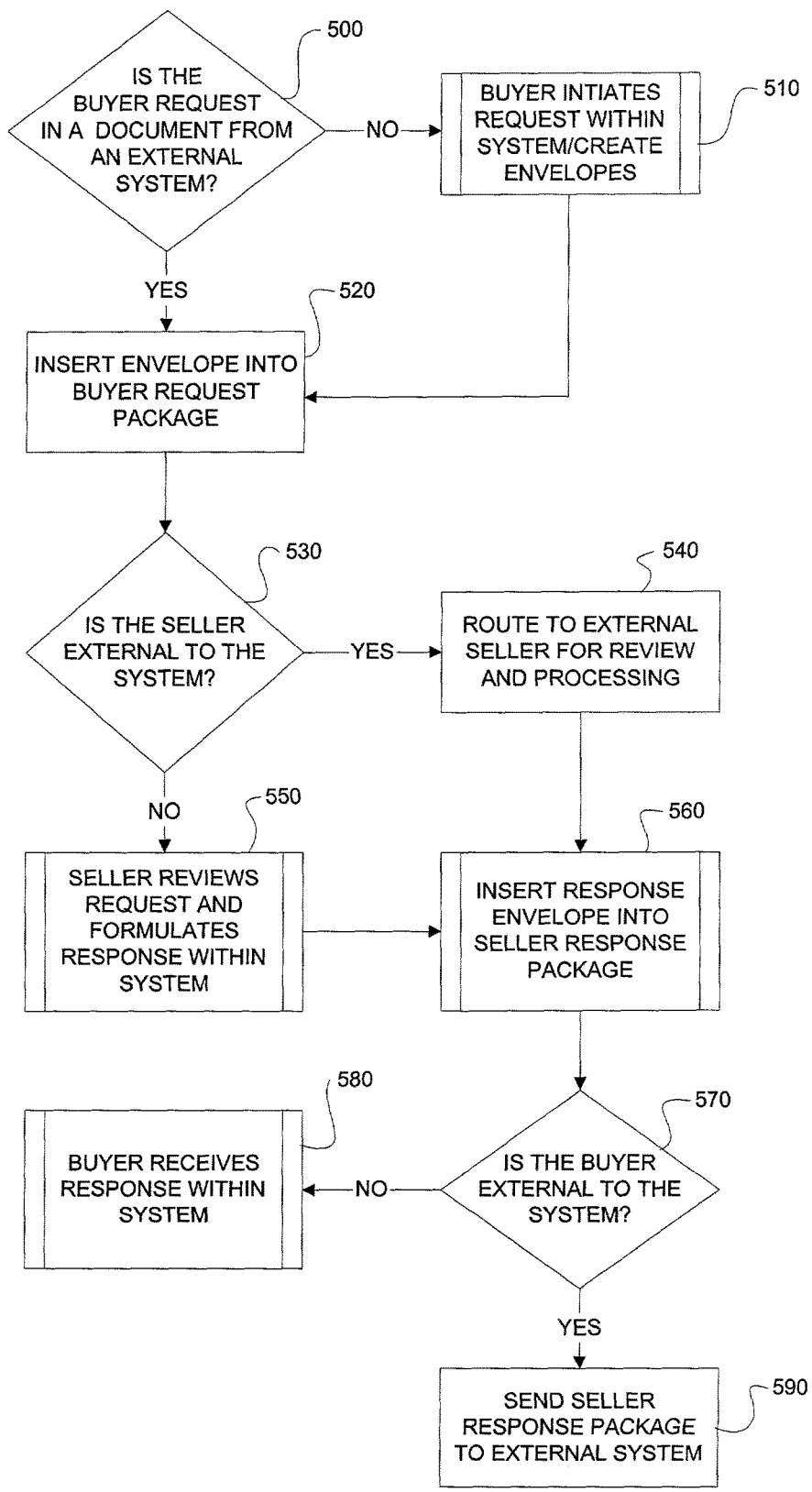
FIG. 5 is a logic diagram indicating the decisions made in determining the path to take between the functions of FIG. 4.
Figure 6:
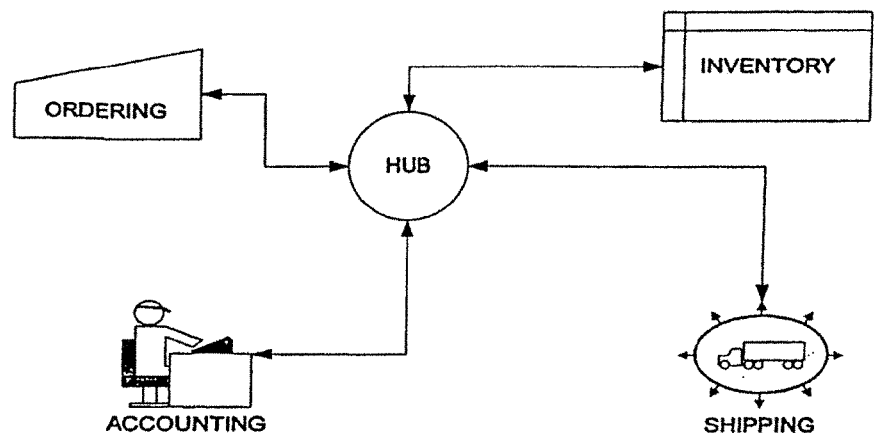
FIG. 6 is a prior art diagram of exemplary components of a hub and spoke business component integration system.
Figure 7:
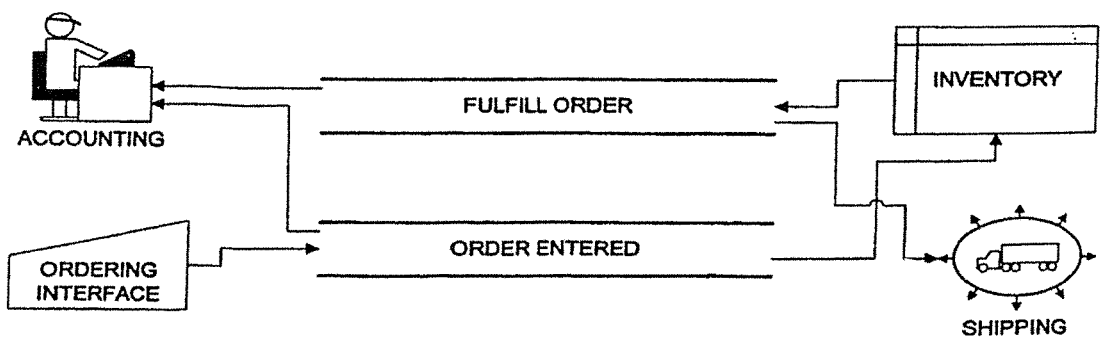
FIG. 7 is a prior art diagram of exemplary components of a channel linked business component integration system.

FIG. 5 is a logic flow for the routing performed between the process functions described with reference to FIG. 4. The system 100 first determines whether the buyer request is originated external to the platform 120, step 500. If the request is external, the related envelopes are simply passed and inserted into the request package, step 520. If the request is originated within the platform 120, the DTD dynamic processing system 100 must tag the documents, step 510, to create the envelopes that are then inserted into the request package, step 520. The logic next determines whether a particular seller is external to the system, step 530, (e.g., the seller desires to perform its own document processing). If so, the request package is routed directly to the seller for external review and processing, step 540. If the seller interfaces with the platform 120 and uses its processing functions, the seller is notified of the request for review and response preparation within the DTD dynamic processing system 100, step 550.

Whether the response documents are prepared within the system 100 or on a seller's external system, the DTD dynamic processing system 100 inserts the prepared envelopes into a response package for provision to the buyer, step 560. The logic then queries whether the buyer is external to the platform 120, step 570. If not, the DTD dynamic processing system 100 processes the response package and the buyer reviews the response within the platform 120 via an interface, step 580. If the buyer is external to the platform 120, the system 100 recognizes that it need not perform any processing and merely routes the envelopes comprising the response package to the buyer system for processing and review, step 590.

Although various embodiments of this invention have been described above with a certain degree of particularity, or with reference to one or more individual embodiments, those skilled in the art could make numerous alterations to the disclosed embodiments without departing from the spirit or scope of this invention. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A dynamic processing system for processing a document present within a complex workflow system and comprising data-type definition (DTD) information, the dynamic processing system comprising:
 a system server receiving the document; and
 a synchronization server constantly monitoring the data exchanges by the system server and determining whether the document has a wellXML tag,
 wherein if the synchronization server determines that the document has a wellXML tag:
  the synchronization server accesses the document from the system server and determines whether immediate processing is required;
  if immediate processing of the document is necessary:
   the synchronization server passes the document to a language execution broker,
   the language execution broker determines instructions for processing the document based on at least the wellXML tag and a data-type definition (DTD) information of the document,
   the language execution broker attaches to the document said determined instructions, wherein the document comprises at least a first data type and a second data type and wherein the instructions comprise information indicating that process results of the first data type be stored for use in subsequent processing of the second data type, wherein said document defines workflow and collaboration specifications for a given complex workflow process corresponding to a complex project and wherein said complex project involves a discrepancy between a purchase order data prepared by a buyer and an actual performance data prepared by a seller that will require reconciliation by the buyer or the seller, and wherein the actual performance data is provided through a field ticket, an invoice or combinations thereof to be compared with the purchase order data to determine the discrepancy, and based on said discrepancy, receiving a proposed reconciliation from the buyer and receiving subsequent approval or disapproval of the proposed reconciliation from the seller, the determined instructions include processing the second data type by utilizing said stored process results obtained by the system from the processing of the first data type, the determined instructions include selecting a correlative processing component based on the determined instructions attached to the document, the determined instructions include coordinating with the processing component, the language execution broker routes the document and the determined instructions to a plug-n-play (PNP) engine, the PNP engine determines an appropriate business component to instantiate to process the document according to the determined instructions, if the business component is internal to the complex workflow system:
　the document is routed within the complex workflow system to the business component for processing; and
　the business component processes the document, and if the business component is external to the complex workflow system:
　the PNP engine contacts the business component of an external system to process the document;
　the PNP engine transmits the document over a communication network to the business component of the external system;
　the business component of the external system processes the document; and
　the PNP engine receives the processed document from the business component of the external system; and if immediate processing of the document is not necessary:
　the synchronization server stores the document in a repository for delayed processing, and wherein if the synchronization server determines that the document does not have a wellXML tag:
　the document is processed through the formal functions of the complex workflow system.

2. The dynamic processing system of claim 1 further comprising a device for receiving the processing results, wherein the document comprises an XML file tailored to a specific industry to provide an interfacing scheme for data structures used to facilitate the transfer of information associated with the specific industry, and wherein the device receives the XML file after the XML file is processed by the processing component.

3. The dynamic processing system of claim 1, the system further comprising a second interface configured for transferring the document to a communication network.

4. The dynamic processing system of claim 1, further comprising a memory for storing the document until the processing results are required by the complex workflow system, wherein at which point the computer instructions for coordinating further comprise instructions to transfer the document from the memory to the processing component.

5. The dynamic processing system of claim 1, wherein the complex workflow system is a component of the dynamic processing system.

6. The dynamic processing system of claim 5, wherein the processing component is external to the complex workflow system.

7. The dynamic processing system of claim 1, wherein the processing component is external to the dynamic processing system.

8. The dynamic processing system of claim 1, wherein the instructions for processing the document comprise DTD information.

9. The dynamic processing system of claim 1, wherein the document comprises a selection from the group comprising: a collection of data, an executable software object, an executable software application, and a relational data structure.

10. The dynamic processing system of claim 3, wherein the communication network comprises a network selected from the group comprising: an intranet, an extranet, a local area network, a wide area network, a public network, and a private network.

11. The dynamic processing system of claim 1, wherein the document is input into the complex workflow system through a first user interface device, wherein the first user interface device is connected to the complex workflow system via the communication network.

12. The dynamic processing system of claim 11, wherein the processing results are provided by the complex workflow system to a second user interface device, wherein the second user interface device is connected to the complex workflow system via the communication network.

13. The dynamic processing system of claim 11, wherein a second user interface device is connected to the complex workflow system via the communication network; and the processing component is connected to the second user interface device.

14. The dynamic processing system of claim 1, wherein the processing results are provided by the complex workflow system to a user interface device, wherein the user interface device is connected to the complex workflow system via the communication network.

15. The dynamic processing system of claim 1 or 8, wherein the DTD information comprises information selected from the group comprising: document identification information, input parameter information, output parameter information, address information, and profile information.

16. The dynamic processing system of claim 1, wherein the processing component comprises a component selected from the group comprising: an executable software object, a relational database program, a processor, and a hardware component.

17. A method of operating a dynamic processing system for processing at least one document present within a complex workflow system and comprising data-type definition information, the dynamic processing system including a system server receiving the document and a synchronization server, the method comprising:
　using the synchronization server to constantly monitor the data exchanges by the system server and determine whether the document has a wellXML tag;
　if the synchronization server determines that the document has a wellXML tag:
　　accessing, by the synchronization server, the document from the system server, determining, by the synchronization server, whether immediate processing of the document is required, if immediate processing of the document is necessary:
  passing the document from the synchronization server to a language execution broker;
  determining, by the language execution broker, instructions for processing the at least one document based on at least the wellXML tag and a data-type definition (DTD) information of the document;
  attaching, by the language execution broker, the determined instructions to the document, wherein the document comprises at least a first data type and a second data type and wherein the instructions comprise information indicating that process results of the first data type be stored for use in subsequent processing of the second data type, wherein said document defines workflow and collaboration specifications for a given complex workflow process corresponding to a complex project and wherein said complex project involves a discrepancy between a purchase order data prepared by a buyer and an actual performance data prepared by a seller that will require reconciliation by the buyer or the seller, and wherein the actual performance data is provided through a field ticket, an invoice or combinations thereof to be compared with the purchase order data to determine the discrepancy, and based on said discrepancy, receiving a proposed reconciliation from the buyer and receiving subsequent approval or disapproval of the proposed reconciliation from the seller;
  including within the determined instructions:
    processing the second data type by utilizing said stored process results obtained by the system from the processing of the first data type,
    selecting a correlative processing component based on the determined instructions attached to the document, and
    coordinating with the processing component;
  routing the document and the determined instructions from the language execution broker to a plug-n-play (PNP) engine;
  determining, by the PNP engine, an appropriate business component to instantiate to process the document according to the determined instructions;
  if the business component is internal to the complex workflow system:
    routing the document within the complex workflow system to the business component for processing, and
    processing the document by the business component; and
  if the business component is external to the complex workflow system:
    contacting, by the PNP engine, the business component of an external system to process the document,
    transmitting, by the PNP engine, the document to the business component of the external system over a communication network, and
    processing the document by the business component of the external system, and
if immediate processing of the document is not necessary:
  storing, by the synchronization server, the document in a repository for delayed processing; and
  if the synchronization server determines that the document does not have a wellXML tag:
    processing the document through the normal functions of the complex workflow system.

18. The method of claim 17, wherein the processor component is external to the complex workflow system; and the processor component is connected to the complex workflow system via the communication network.

19. The method of claim 17 further comprising storing the document in a memory until the processing results are required by the complex workflow system.

20. The method of claim 17, further comprising receiving the processing results after the document is processed by the business component, wherein the results comprise an output file with an industry-appropriate data subset.

21. The method of claim 18, further comprising receiving the processing results via the communication network after the document is processed by the business component.

22. The method of claim 17, wherein the at least one document comprises an XML tagged document comprising a dataset that identifies an industry-appropriate data subset, and wherein the method further comprises: interfacing with the complex workflow system to determine a document processing requirement.

23. The method of claim 17, wherein the data-type definition information comprises information selected from the group comprising: document identification information, input parameter information, output parameter information, address information, and profile information.

24. The method of claim 17, wherein the document comprises a WELLXML data file configured for the oil and gas industry.

25. The method of claim 17, wherein the document comprises an XML file tailored to a specific industry to provide an interfacing scheme for data structures used to facilitate the transfer of information associated with the specific industry, and wherein the processor component comprises a component selected from the group comprising: an executable software object, a relational database program, a processor, and a hardware component.

26. The method of claim 17 further comprising receiving the document as input from a first user interface device, wherein the first user interface device is connected to the complex workflow system via the communication network.

27. The method of claim 26 further comprising providing the processing results to a second user interface device, wherein the second user interface device is connected to the complex workflow system via the communication network.

28. The method of claim 26, wherein the processing component is connected to a second user interface device; and the second user interface device is connected to the complex workflow system via the communication network.

29. The method of claim 21, further comprising providing the processing results to a user interface device, wherein the user interface device is connected to the complex workflow system via the communication network.

30. The method of claim 18 or 26, wherein the communication network comprises a network selected from the group comprising: an intranet, an extranet, a local area network, a wide area network, a public network, and a private network.

31. A computer program product for instructing at least one computer processor within a complex workflow system to dynamically instantiate a processor component for processing a document, wherein the document is present within a complex workflow system, the complex workflow system including a system server that receives the document and a synchronization server, the computer program product comprising a non-transitory computer readable medium having computer readable program code embodied therein for controlling the complex workflow system, the computer readable program code comprising instructions for:
causing the synchronization server to:
  constantly monitor the data exchanges by the system server, and
  determine whether the document has a wellXML tag;
if the synchronization server determines that the document has a wellXML tag:
  causing the synchronization server to:
    access the document from the system server; and
    determine whether immediate processing of the document is required,
  if immediate processing of the document is necessary:
    causing the synchronization server to pass the document to a language execution broker;
    causing the language execution broker to:
      determine instructions for processing the document based on at least the wellXML tag and a data-type definition (DTD) information of the document,
      attach the determined instructions to the document, wherein the document comprises at least a first data type and a second data type and wherein the instructions comprise information indicating that process results of the first data type be stored for use in subsequent processing of the second data type, wherein said document defines workflow and collaboration specifications for a given complex workflow process corresponding to a complex project and wherein said complex project involves a discrepancy between a purchase order data prepared by a buyer and an actual performance data prepared by a seller that will require reconciliation by the buyer or the seller, and wherein the actual performance data is provided through a field ticket, an invoice or combinations thereof to be compared with the purchase order data to determine the discrepancy, and based on said discrepancy, receiving a proposed reconciliation from the buyer and receiving subsequent approval or disapproval of the proposed reconciliation from the seller,
      include within the determined instructions:
        processing the second data type by utilizing said stored process results obtained by the system from the processing of the first data type;
        selecting a correlative processing component based on the determined instructions attached to the document; and
        coordinating with the processing component, and
      route the document and the determined instructions attached to the document to a plug-n-play (PNP) engine;
    causing the PNP engine to determine an appropriate business component to instantiate to process the document according to the determined instructions;
    if the business component is internal to the complex workflow system:
      causing the document to be routed within the complex workflow system to the business component for processing, and
      causing the business component to process the document; and if the business component is external to the complex workflow system:
  causing the PNP engine to contact the business component of an external system to process the document, and to transmit the document to the business component of the external system over a communication network, and
  causing the business component of the external system to process the document, and
if immediate processing of the document is not necessary, causing the synchronization server to store the document in a repository for delayed processing; and
if the synchronization server determines that the document does not have a wellXML tag, processing the document through the normal functions of the complex workflow system.

32. The computer program product of claim 31, wherein the computer readable program code further comprises instructions for causing the at least one computer processor to monitor the complex workflow system for the presence of the document within the complex workflow system.

33. The computer program product of claim 31, wherein the processor component is external to the complex workflow system; and the processor component is connected to the complex workflow system via the communication network.

34. The computer program product of claim 31, wherein the computer readable program code further comprises instructions for causing the at least one computer processor to store the document in a memory until the processing results are required by the complex workflow system.

35. The computer program product of claim 31, wherein the computer readable program code further comprises instructions for causing the at least one computer processor to receive the processing results after the document is processed by the business component.

36. The computer program product of claim 33, wherein the computer comprises an XML tagged document that defines business component instantiation and execution, input and output parameters, and workflow and collaboration specifications for said given complex workflow process, and wherein the computer readable program code further comprises instructions for causing the at least one computer processor to receive the processing results via the communication network after the XML tagged document is processed by the business component.

37. The computer program product of claim 31, wherein the system server receives a first document and a second document; and
  wherein the computer readable program code further comprises instructions for: causing the at least one computer processor to interface with the complex workflow system to determine a document processing requirement; and causing the computer processor to coordinate an order of processing between the first document and the second document based upon the document processing requirement.

38. The computer program product of claim 31, wherein the instructions comprise data-type definition information.

39. The computer program product of claim 31 or 38, wherein the data-type definition information comprises information selected from the group comprising: document identification information, input parameter information, output parameter information, address information, and profile information.

40. The computer program product of claim 31, wherein the document comprises an XML tagged document comprising a dataset that identifies an industry-appropriate data subset.

41. The computer program product of claim 31, wherein the processor component comprises a component selected from the group comprising: an executable software object, a relational database program, a processor, and a hardware component.

\* \* \* \* \*